United States Patent
Avakian

(10) Patent No.: US 7,615,588 B2
(45) Date of Patent: Nov. 10, 2009

(54) REINFORCED THERMOPLASTIC COMPOSITIONS WITH ENHANCED PROCESSABILITY

(75) Inventor: Roger W. Avakian, Aurora, OH (US)

(73) Assignee: PolyOne Corporation, Avon Lake, OH (US)

( * ) Notice: Subject to any disclaimer, the term of this patent is extended or adjusted under 35 U.S.C. 154(b) by 282 days.

(21) Appl. No.: 11/573,907

(22) PCT Filed: Aug. 26, 2005

(86) PCT No.: PCT/US2005/030598

§ 371 (c)(1), (2), (4) Date: Feb. 19, 2007

(87) PCT Pub. No.: WO2006/026530

PCT Pub. Date: Mar. 9, 2006

(65) Prior Publication Data

US 2008/0097011 A1    Apr. 24, 2008

Related U.S. Application Data

(60) Provisional application No. 60/605,492, filed on Aug. 30, 2004.

(51) Int. Cl.
  C08K 9/04    (2006.01)
  C08K 3/02    (2006.01)
(52) U.S. Cl. ......................... 524/445; 524/80
(58) Field of Classification Search ............ 524/445
  See application file for complete search history.

(56) References Cited

U.S. PATENT DOCUMENTS

| | | | |
|---|---|---|---|
| 4,250,074 A | 2/1981 | Foscante et al. | |
| 4,254,002 A | 3/1981 | Sperling et al. | |
| 4,739,007 A | 4/1988 | Okada et al. | |
| 5,281,669 A | 1/1994 | Kambour et al. | |
| 5,300,590 A | 4/1994 | Cook et al. | |
| 5,707,439 A | 1/1998 | Takekoshi et al. | |
| 6,017,586 A | 1/2000 | Payn et al. | |
| 6,111,013 A | 8/2000 | Simpson et al. | |
| 6,184,333 B1 | 2/2001 | Gray | |
| 6,271,297 B1 * | 8/2001 | Ishida | 524/445 |
| 6,287,706 B1 | 9/2001 | Simpson et al. | |
| 6,337,126 B1 | 1/2002 | Simpson et al. | |
| 6,500,892 B1 * | 12/2002 | Bishop et al. | 524/445 |
| 6,617,398 B2 | 9/2003 | Yeager et al. | |
| 6,627,708 B2 | 9/2003 | Braat et al. | |
| 6,693,149 B2 | 2/2004 | Yin et al. | |

OTHER PUBLICATIONS

"Modeling Domain Mixing in Semi-Interpenetrating Polymer Networks Composed of Poly(Vinyl Chloride) and 5% to 15% of Crosslinked Thermosets" Polymer Engineering and Science, Sep. 2000, vol. 40, No. 9, pp. 2027-2036.
Chemecol "Redefining Plastics"—Presentation to PolyOne Corporation, Jan. 9, 2002.
"Noryl GTX Alloy—The New Thermoplastic With Proven On-Line Paintability", GE Plastics Europe, Article in CEP Info.
Noryl GTX PPE/PA Resin product information, General Electric Company website, Copyright 1997-2003.
Kopchik et al., "A Tough and Flexible Syndiotactic Polypropylene—Acrylic System Made via In Situ Polymerization" ANTEC 2002.
Patent Abstracts of Japan for JP 2000 044812.
Patent Abstracts of Japan for JP 2005 162839.
Patent Abstracts of Japan for JP 61 062542.

* cited by examiner

Primary Examiner—Ling-Siu Choi
Assistant Examiner—Hui Chin
(74) Attorney, Agent, or Firm—John H. Hornickel

(57) ABSTRACT

A thermoplastic composition is disclosed comprising a continuous phase of at least one thermoplastic polymer; and a non-polymeric precursor polymerizable to provide a polymerized reinforcing phase dispersed within the thermoplastic polymer. The precursor is polymerized after dispersion into the continuous phase of thermoplastic polymer. The flexural modulus of the thermoplastic polymer is thereby increased. Methods of making and using the composition are also disclosed.

19 Claims, No Drawings

REINFORCED THERMOPLASTIC COMPOSITIONS WITH ENHANCED PROCESSABILITY

CLAIM OF PRIORITY

This application claims priority from U.S. Provisional Patent Application Ser. No. 60/605,492 and filed on Aug. 30, 2004.

BACKGROUND OF THE INVENTION

The present invention relates generally to thermoplastic polymers having polymeric reinforcing phases dispersed therein.

In the past several decades, the use of polymers has transformed the world. Polymer science has rapidly evolved to make thousands of different thermoplastic and thermosetting products within the four corners of polymer physics: thermoplastic plastics, thermoplastic elastomers, thermoset plastics, and thermoset elastomers.

No large scale production of any polymer can rest on current ingredients or processing conditions. Reduction of cost, improvement of productivity, delivery of better performing, lower cost products all drive the polymer science industry. The situation is no different for thermoplastic compositions.

When formulating thermoplastic compositions for use in elevated temperature environments, other considerations become a further driving force. Generally, as the temperature of a composition increases during use, the flexural modulus of that composition decreases. Depending on the anticipated use of the composition, a decrease in flexural modulus may be undesirable and compromise performance of the composition in the intended application. While articles can be designed with a higher stiffness than the underlying composition inherently provides, design alone is not always able to compensate for a composition's relatively low flexural modulus in certain applications, particularly elevated temperature applications.

In order to alleviate this disadvantage, reinforcing fillers can be added to a composition to increase its flexural modulus. Fillers in general are often utilized for improving certain performance properties of compositions. Those properties are many and varied, ranging from impact strength to flame retardancy to name a few.

Known reinforcing fillers include both organic and inorganic materials. It is often the case that, whatever their type, fillers are formed prior to their addition to a composition. That is, they are formed ex-situ.

While the addition of conventional fillers to a composition in this manner has its benefits, it also has its shortcomings. Notably, addition of polymerized fillers for improving elevated temperature flexural modulus of a composition tends to make processing of the composition (e.g., into the shape of a desired article) more difficult. Those types of fillers generally increase the composition's viscosity and sometimes even require heating to relatively high temperatures in order to melt the polymerized filler effectively and/or disperse the polymerized filler throughout a composition during processing of, for example, neat compositions.

When incorporation of amorphous polymeric reinforcing filler is desired, these processing difficulties and efficiencies are even more prevalent. Effective dispersion of amorphous polymeric reinforcing filler often requires heating the composition to a temperature of at least about 100° C. greater than the glass transition temperature (Tg) of the amorphous polymeric reinforcing filler, which would typically already have a relatively high Tg.

When crystalline reinforcement is desired, processing temperatures of about 10° C. to about 30° C. greater than the melting temperature (Tm) of the polymerized reinforcing filler are generally required to effectively disperse that type of filler within a system. Melting temperatures of materials are generally much higher than glass transition temperatures. Thus, again this need for elevated temperatures can pose processing difficulties and efficiencies.

Increasing the viscosity of a composition by and large generally decreases the efficiency of processing of the composition due to excessive shear during heating. Further, the use of higher processing temperatures may lead to degradation of one or more of the other components in the composition being processed. Thus, when processing materials (e.g., thermoplastics) at elevated temperatures (e.g., when melt-processing such as for injection molding or calendering of the composition), it is generally desirable to decrease the viscosity of the compositions in order to increase production efficiency thereof and avoid the necessary use of higher temperatures.

Oils and similar processing aids have been utilized for this purpose with certain materials and in certain applications. The addition of those types of components, however, tends to increase the overall softness and flexibility of the resulting products, which may be undesirable for certain applications. Further, when liquid plasticizers are used to reduce a composition's viscosity during processing, those plasticizers can migrate undesirably within or out of the resulting composition and articles. Not only does this pose environmental concerns, but it also compromises intended performance properties of the composition and the article.

BRIEF SUMMARY OF THE INVENTION

What is needed in the art of thermoplastics is a way of not only enhancing processability of thermoplastic compositions, particularly those that are reinforced with polymeric compositions that serve as organic reinforcing fillers, but also providing more flexibility in derivation of resulting relatively stiff articles.

The present invention solves that problem in the art by providing new thermoplastic compositions comprising a thermoplastic polymer matrix with a polymeric reinforcing phase dispersed therein. Compositions of the invention and articles formed therefrom have improved elevated temperature performance properties as well as efficiency-enhanced processes for formation of the compositions and articles.

The reinforcing phase is polymerized in-situ during processing of the composition, at a point in time and in a way that does not degrade processability of the composition to the extent seen with compositions where organic reinforcing filler is first polymerized and then attempted to be dispersed within a thermoplastic polymer matrix. The invention accomplishes this benefit without comprising the beneficial effects for which the reinforcing phase is used.

Processes of preparing compositions of the invention generally include at least the first two of the following steps: providing at least one thermoplastic polymer, dispersing at least one non-polymeric precursor within the thermoplastic polymer under conditions where polymerization of the precursor will not occur, and polymerizing the precursor such that a polymerized reinforcing phase is dispersed within a continuous phase of the thermoplastic polymer. The last step need not be partially or fully completed until after processing (e.g., melt processing) of an intermediate composition, which is formed after the first two steps, into a final article. Once the final composition is formed, the thermoplastic polymer forms a continuous matrix for the in-situ formed polymeric reinforcing phase dispersed therein.

Reinforcement is provided by the use of precursors that result in a polymerized reinforcing phase having a higher glass transition temperature (Tg) and/or melting temperature (Tm) than those same properties of the thermoplastic matrix material in which it is dispersed. In accomplishing this, the polymerized reinforcing phase has at least one of a melting temperature greater than about 100° C., or a glass transition temperature greater than about 100° C., or both.

When the polymerized reinforcing phase is amorphous, its Tg is at least about 50° C. greater than the Tg of the thermoplastic polymer matrix. When the polymerized reinforcing phase is crystalline, its Tm is at least about 50° C. greater than the Tg of an amorphous thermoplastic polymer or Tm of a crystalline thermoplastic polymer in which it is dispersed. In progressively preferable embodiments of the invention, these differences between the Tg or Tm of the thermoplastic polymer and Tg or Tm of the polymerized reinforcing phase become increasingly large.

In one embodiment of the invention, the non-polymeric precursor is non-polymeric. In another embodiment of the invention, the non-polymeric precursor is oligomeric. In this latter embodiment, at least one of the polymerized reinforcing phase and the thermoplastic polymer comprises an amorphous polymer, because of processing difficulties due the morphology of two-phase structures where both phases are crystalline.

Not only are heretofore unobtainable thermoplastic compositions based on enhanced thermoplastic reinforcing phases made possible by the present invention, but also made possible are those based on thermoset reinforcing phases. According to further embodiments of the invention, the reinforcing phase comprises a thermoset composition. In this embodiment, the precursor for the reinforcing phase comprises crosslinkable components (e.g., multifunctional monomers) for formation of a thermoset therefrom. The use of a thermoset reinforcing phase provides even further enhancements in flexural modulus when desired.

Features and advantages of the reinforced thermoplastic polymer compositions of the present invention and processes for their preparation and articles therefrom will become apparent from disclosure of the embodiments and examples of the invention below.

DETAILED DESCRIPTION OF THE INVENTION

Definitions

The term "amorphous" refers to a polymeric material that does not have a measurable melting temperature when analyzed using Differential Scanning Calorimetry (DSC).

The term "copolymer" is used to encompass polymers prepared from at least two chemically different monomer units. Thus, the term "copolymer" encompasses those polymers prepared from two different monomer units, those prepared from three different monomer units (also known as terpolymers), et cetera.

The term "crystalline" refers to a polymeric material having a measurable melting temperature when analyzed using Differential Scanning Calorimetry (DSC). For simplicity, included within the definition of crystalline according to the invention are both crystalline and semi-crystalline materials.

The "glass transition temperature" or "Tg" of a material is that temperature at which a material changes from a brittle vitreous state to a plastic state as known to those of skill in the art. The Tg of a material is measurable using any of a variety of known analytical techniques. For example, differential scanning calorimetry is one widely used analytical technique. Other techniques include, for example, density, dielectric thermal analysis (DETA), differential thermal analysis (DTA), dilatometer, dynamic mechanical thermal analysis (DMTA), elastic modulus, and thermomechanical analysis (TMA) methods.

The term "(meth)acrylate" encompasses both methacrylate and acrylate materials. Similarly, the term "(meth)acrylic" encompasses both methacrylic and acrylic materials.

The term "non-polymeric" encompasses those compounds that do not exhibit polymeric properties as understood by those skilled in the art. Thus, non-polymeric materials according to the invention include both oligomers, which contain relatively few repeat units (e.g., dimers, trimers, and tetramers), and single unit monomers.

The term "softening point" means the temperature at which the morphology of a compound begins to change from crystalline solid toward amorphous solid or liquid. The softening point of a material is measurable using any of a variety of known analytical techniques. For example, differential scanning calorimetry is one widely used analytical technique. Other techniques include, for example, density, dielectric thermal analysis (DETA), differential thermal analysis (DTA), dilatometer, dynamic mechanical thermal analysis (DMTA), elastic modulus, and thermomechanical analysis (TMA) methods.

The term "thermoplastic polymer" encompasses all polymeric materials having a measurable softening or melting temperature. Included within the scope of thermoplastic polymers of the invention are composite materials, where at least one phase of the two or more phases therein comprises a thermoplastic polymer. For example, engineering materials such as thermoplastic elastomers are composite materials that have at least one thermoplastic polymer phase.

Reinforced Thermoplastic Compositions

Reinforced thermoplastic compositions of the invention generally are prepared using at least one thermoplastic polymer and a plurality of at least one non-polymeric precursor, which is polymerizable to provide a reinforcing phase dispersed within a continuous phase of the thermoplastic polymer.

The phase size of the reinforcing phase will vary depending on the chemical and physical nature of the components in the composition, as well as the processing conditions used. Preferably, however, the dispersed reinforcing phase has an average domain size of less than about 100 microns in diameter. Preferably, the shape of the domains is spherical, although other shapes are useful because the morphology of the dispersed reinforcing phase of less than about 100 microns in diameter is believed to be better than other morphologies, such as interpenetrating networks of two phases.

With in-situ polymerization of the reinforcing phase, not only is processing of the composition advantageously influenced, but physical properties of the resulting composition are influenced advantageously for many applications as well. For example, it is believed that in-situ polymerization of the reinforcing phase provides improved adhesion between the thermoplastic polymer matrix and reinforcing phase. This improved adhesion facilitates improved physical properties as compared to those properties of a chemically identical composition, but that which is prepared by physically blending the thermoplastic matrix and reinforcing phase. This improved adhesion minimizes separation of the reinforcing phase from the thermoplastic polymer matrix during use of the material, something which is of concern particularly when using the resulting composition at elevated temperatures or under mechanical stress.

Reinforcement of the thermoplastic polymer is based on the use of a polymeric reinforcing phase dispersed therein, which has a higher glass transition temperature (Tg) and/or melting temperature (Tm) than those same properties of the thermoplastic polymer. Therefore, the thermoplastic polymer is selected according to this criterion.

Benefits of the invention are optimized when the base thermoplastic polymer is in need of reinforcement, such as is the case, for example, with relatively soft polyolefins. Thus, for optimal effect, the thermoplastic polymer preferably has a relatively low glass transition temperature (Tg) or softening point as compared to the polymerized reinforcing phase, which is described further below. When a polymerized reinforcing phase has more than one Tg, the lowest measurable Tg is utilized for comparison. When a thermoplastic polymer has more than one Tg, the highest measurable Tg is utilized for this comparison.

For purposes of this selection, when a polymeric component of the composition does not have a clearly defined Tg, its softening point is utilized for comparison. This may be the case, for example, if the polymeric component comprises a mixture of many different materials with different glass transition temperatures, the overall Tg of which is indistinguishable. This can occur, for example, when thermally analyzing rosin esters and other natural products.

When the polymeric reinforcing phase is amorphous, its Tg relative to the Tg of the thermoplastic polymer in which it is dispersed is any discernible temperature above the Tg of the thermoplastic polymer in which it is dispersed. Preferably, the Tg of the polymeric reinforcing phase is at least about 50° C. greater than the Tg of the thermoplastic polymer in which it is dispersed.

When the polymeric reinforcing phase is crystalline, its Tm relative to the Tg of the thermoplastic polymer in which it is dispersed is any discernible temperature above the Tg of the thermoplastic polymer in which it is dispersed. Preferably, the Tm of the polymeric reinforcing phase is at least about 50° C. greater than the Tg of an amorphous thermoplastic polymer or at least about 50° C. greater than the Tm of a crystalline thermoplastic polymer in which it is dispersed.

In progressively preferable embodiments of the invention, these differences between the Tg or Tm of the thermoplastic polymer and Tg or Tm of the polymerized reinforcing phase become increasingly large. More preferably, the difference between the Tg of the thermoplastic polymer and the polymerized reinforcing phase is at least about 50° C., and most preferably at least about 100° C. In many preferred embodiments, this temperature difference is about 100° C. to about 200° C.

In obtaining reinforced thermoplastic compositions of the invention, any suitable thermoplastic polymer or combinations thereof may be used as the thermoplastic polymer component. Thermoplastic polymers are defined above.

While the Tg and/or Tm of the thermoplastic polymer selected depends on the nature of the reinforcing phase, the Tg of the thermoplastic polymer in most preferred embodiments of the invention is about −50° C. to about 450° C., even more often being about −20° C. to about 180° C. in preferred embodiments. It should be understood that the actual Tg of the thermoplastic polymer may vary, however, as it depends on several factors such as for example molecular weight, molecular weight distribution, tacticity, thermal history, purity, and method of Tg measurement.

The thermoplastic polymer can be, for example, a polyolefin or poly(meth)acrylate. Other thermoplastic polymers can also be used in the invention. For example, polyvinyl chloride (PVC) (particularly that which is plasticized, some of which has a Tg of about −40° C. as compared to non-plasticized PVC, which has a Tg of about 80° C.), polyamides, and polyesters are beneficially reinforced according to the present invention. Polyamides in particular are known to absorb ambient moisture at room temperature, causing them to become undesirably leathery in nature. When reinforced according to the present invention, those undesirable effects are minimized.

Thermoplastic polyolefins have proven themselves useful as a foundation for polymer science and engineering because of their relatively low cost and high-volume production of thermoplastic polyolefins based on petrochemical production. Non-limiting examples of thermoplastic polyolefins useful in the invention include homopolymers and copolymers of lower α-olefins such as 1-butene, 1-pentene, 1-hexene, 2-methyl-1-propene, 3-methyl-1-pentene, 4-methyl-1-pentene, and 5-methyl-1-hexene, as well as ethylene, butylene, and propylene, with the homopolymer of propylene being preferred.

Non-limiting examples of polypropylene useful for the present invention are those commercially available from suppliers such as Dow Chemicals, Huntsman Chemicals, ExxonMobil Chemicals, Basell Polyolefins, and BP Amoco.

Thermoplastic polyolefins that are particularly preferred for use in the invention are metallocene-derived polyolefins. Metallocene-derived polyolefins tend to be more uniform in structure (e.g., having a relatively narrow molecular weight distribution and more uniform tacticity) as compared to those polyolefins prepared using other polymerization catalysts. Those properties tend to make metallocene-derived polyolefins more desirable for certain applications.

As noted above, the invention is not limited to the use of polyolefins for the thermoplastic polymer. Another preferred class of materials for use as the thermoplastic polymer is polyamides. For example, PA 6 and PA 6.6 are well known and beneficially used nylons as the thermoplastic polymer of the present invention. Other thermoplastic polymers suitable for the invention include ethylene vinyl acetate, thermoplastic olefins, thermoplastic elastomers, thermoplastic vulcanizates, polyvinyl halides, chlorinated polyvinyl halides, polyalkyl(meth)acrylates, styrenic homopolymers and copolymers, acrylonitrile homopolymers and copolymers, polyesters, epoxies, polyaryl sulfides, polyetheretherketone, polyether imides, polyacetals, and blends and alloys thereof.

The reinforcing phase is prepared from a non-polymeric precursor that comprises a plurality of monomers and/or oligomers. In one embodiment, the non-polymeric precursor is monomeric. Due to their lower molecular weight, the use of monomers generally affords the most processing advantages.

The invention is not so limited, however. In another embodiment, the non-polymeric precursor comprises a plurality of oligomers polymerizable to provide a polymerized reinforcing phase in a continuous thermoplastic polymer matrix. In this embodiment, at least one of the thermoplastic polymer and polymerized reinforcing phase comprises an amorphous polymer.

Preferably, once polymerized and when at least one of the thermoplastic polymer and the polymerized reinforcing phase is amorphous, the reinforcing phase has a glass transition temperature (Tg) that is relatively high compared to the Tg of the thermoplastic polymer matrix. Similarly, when both the polymerized reinforcing phase and the thermoplastic polymer comprise crystalline materials, the reinforcing phase has a melting temperature (Tm) that is relatively high compared to the Tm of the thermoplastic polymer matrix. In both of these embodiments, the polymerized reinforcing phase has at least one of a Tm greater than about 100° C. or a Tg greater than about 100° C.

While the Tg (or Tm) of the reinforcing phase depends on the nature and selection of the thermoplastic polymer, in most preferred embodiments of the invention the polymerized reinforcing phase has a Tg greater than about 100° C., even more often being about 100° C. to about 300° C., and most often being greater than 160° C. to about 250° C. It should be understood that the actual Tg of the polymerized reinforcing phase may vary, however, as it depends on several factors such as for example molecular weight, molecular weight distribution, tacticity, thermal history, purity, method of Tg measurement, and components of the non-polymeric precursor.

In a preferred embodiment, when monomeric components form the basis for the non-polymeric precursor, any suitable monomers can be used. Included within the wide variety of suitable non-polymeric precursor components are adipates, alkyds, cyanurates (including isocyanurates), epoxies, esters, ethers, imides, lactams (e.g., caprolactams), maleimides, melamines, (meth)acrylates, olefins, phenolics, and styrenes. As is well known, a wide variety of monomers are included within each of these general classes of materials. The monomers can be substituted optionally with any number of well known substituents (e.g., single atoms such as oxygen and sulfur, as well as more complex compounds, et cetera). So long as the monomers are capable of forming a polymerized reinforcing phase according to the invention, they can be used as such.

A number of commercial sources, such as Aldrich Chemical Company (Milwaukee, Wis.), are available for the supply of monomers and polymerization components suitable for preparation of polymerized reinforcing phases of the invention. Examples of specific monomers include those available from Sartomer under the trade designations SR-238, SR-313, and SR-489 and those available from Shell Chemical Company under the EPON 828 trade designation, Huntsman Advanced Materials under the ARALDITE trade designation, and Union Carbide under the ERL-4221 trade designation, for example.

According to one aspect of this embodiment of the invention, the non-polymeric precursor, or at least a major portion thereof, has a relatively low molecular weight. For example, in this embodiment the non-polymers have a weight average molecular weight of about 500 or less grams/mole, more typically about 1,000 or less. This contributes to further processing efficiencies.

In another embodiment of the invention, the polymerized reinforcing phase, or at least a major portion thereof, is essentially non-reactive with the other components in the composition such that it does not result in undesired crosslinking, degradation, or chain scission within the overall thermoplastic composition. In that regard, for example, it is preferred that the resulting polymerized reinforcing phase is substantially free of defect sites prone to degradation. In that manner, the thermoplastic composition retains its nature as a blend of a dispersed polymeric reinforcing phase within a continuous phase of a thermoplastic polymer.

Note, however, that in certain embodiments, the precursor to the reinforcing phase may contain crosslinkable components, for example, by way of inclusion of multifunctional monomeric or oligomeric components therein such that the reinforcing phase formed in-situ is a thermoset polymer. By providing a crosslinked reinforcing phase within the thermoplastic polymer matrix, reinforcing phase materials that might otherwise provide insufficient reinforcement are able to be utilized according to the invention due to the ability of crosslinking to sufficiently raise the Tg of such materials in the overall thermoplastic composition.

One example of a precursor providing further enhancement in Tg is described in U.S. Pat. No. 6,184,333. As described therein, that crosslinkable precursor is polymerizable to PMR-15 polyimide (polymerization of Monomeric Reactants, 1500 molecular weight) and other Tg-enhanced materials.

In yet another embodiment of the invention, the precursor polymerizable to a reinforcing phase is premixed with reinforcing filler. This embodiment provides further flexibility in selection of chemical constituents for the reinforcing phase and precursors therefor. The reinforcing filler is any suitable component that increases the crystallinity of the resulting polymer, which effectively increases the strength of the resulting polymerized reinforcing phase and raises the flexural modulus of reinforced thermoplastic compositions based thereon. Suitable reinforcing fillers include, for example, nanoclays, nanotalcs, nano zinc oxides, and others. Of these, in-situ polymerization of polyamides in the presence of intercalated nanoclays is preferred. Examples of this type of polymerization include those described in U.S. Pat. Nos. 4,739,007; 4,810,734; 4,894,411; and 5,707,439. Alternatively, one can purchase Nanoblend™ concentrate from Polyone Corporation of Avon Lake, Ohio, USA (www.polyone.com) to add a nanoclay reinforcing filler to compositions of the present invention.

Further, unlike addition of reinforcing filler to a polymerized composition, addition of reinforcing filler to a reinforcing phase precursor prior to polymerization of the reinforcing phase decreases the overall amount of reinforcing filler needed in the composition in order to obtain the desired flexural modulus. For example, up to about 20 dry weight percent nanoclay, based on total weight of polymerizable precursor components can sufficiently raise the flexural modulus of the resulting polymerized reinforcing phase such that lower overall amounts of reinforcement are used in the entire thermoplastic composition. Conventional addition of reinforcing filler to polymeric compositions typically requires greater than about 20 weight percent, often about 35 to about 45 weight percent, reinforcing filler based on total weight of the composition to obtain similar levels of flexural modulus. By keeping the needed reinforcing component additions prior to or during processing to a relatively low level, viscosity of the composition is lowered, which effects more efficient processing (e.g., melt processing) of the thermoplastic composition.

In this embodiment, the resultant polymerized reinforcing phase has a glass transition temperature higher than the glass transition temperature of the same components polymerized without the addition of the reinforcing filler. Thus, the array of useful non-polymeric precursor components according to the invention is extended when preparing the compositions in this manner.

Preparable from the non-polymeric precursor are polymerized reinforcing phases such as certain epoxies, melamine resins, phenolics, polyamides, poly(meth)acrylates, polycarbonates, polyesters, polyethers (e.g., polyphenylene ether), and polyimides, for example. In the selection process, it is to be understood that from a chemical nature, it is not necessary that the polymerized reinforcing phase be different than the thermoplastic polymer.

The use of many of these polymerized reinforcing phase materials in reinforcing thermoplastic polymers was previously impractical. For example, the Tg of polyphenylene ether is approximately 200° C. and temperatures of as high as approximately 320° C. are typically required to process polyphenylene ether neat due to its amorphous nature. Thus, it is advantageous to blend the precursors for polyphenylene ether into the thermoplastic polymer prior to polymerization and formation of the polyphenylene ether because of the otherwise higher temperatures and longer processing times that would be needed to sufficiently disperse the resultant polyphenylene ether within a thermoplastic polymer matrix.

Within these classes of materials, the Tg and/or Tm can vary depending on a multitude of factors, including for example the types of components used to prepare the polymerized reinforcing phase. Thus, the polymerizable components and polymerization/curing additives of the non-polymeric precursor are selected according to the desired Tg and/or Tm of the reinforcing phase. Those of skill in the art are readily familiar with selection of components and polymerization techniques based thereupon. For example, it is known that the Tg and/or Tm of polymerized epoxies is heavily influenced by the type of curative used, while the Tg and/or Tm of polymerized (meth)acrylates is heavily influenced by the type of monomers used, in their preparation.

When needed, a polymerization initiator, accelerator, catalyst, or other well known polymerization additives are also compounded into the thermoplastic polymer along with the monomeric and/or oligomeric components. Again, those of ordinary skill in the art are readily able to select the appropriate type and amount of polymerization additives based upon the polymerizable components and the desired Tg or Tm of the reinforcing phase polymerized therefrom.

Any suitable additive may be included in desired amounts in thermoplastic compositions of the invention. Further, fillers (e.g., nanoclay, calcined clay, kaolin clay, talc, silicates, and carbonates), pigments and colorants (e.g., carbon black), flame retardants, antioxidants, compatibilizers, conductive particles, carbon fibrils, carbon nanotubes, inherently conductive polymers, inherently dissipative polymers, impact modifiers, UV-inhibitors, stabilizers, coupling agents (e.g., silanes, maleated polyolefins, zirconates and titanates), plasticizers, lubricants, antiblocking agents, antistatic agents, waxes, foaming agents, and combinations thereof may be used in certain applications. Those of ordinary skill in the art will readily understand selection and use of such additives.

One additive in particular may be desired for certain applications, depending on the chemical nature of the reinforcing phase and thermoplastic polymer combined to form the thermoplastic composition. That additive is a compatibilizer or combinations thereof. The use of compatibilizers can help prevent the components of the thermoplastic composition from separating, for example, when the composition is reheated after formation. Often the thermoplastic composition will be reheated after formation, as that is one feature of thermoplastic polymers that is often desirable and its advantages are exploited for many purposes, including recycling of scrap when articles upon formation of articles from the composition. Non-limiting examples of compatibilizers include chlorinated polyethylene, ethylene vinyl acetate, styrene-ethylene-butylene-styrene block copolymers, maleic anhydride, citric acid, etc.

Preparation of Compositions and Articles
Selection of Components

Preferably, the thermoplastic polymer is reinforced with sufficient reinforcing phase to the extent that at least one physical property of the thermoplastic polymer (without the reinforcing phase) is improved. For example, preferred embodiments of the invention provide compositions exhibiting an increased flexural modulus.

Suitable amounts of the reinforcing phase, and hence precursors therefore, are used to prepare the thermoplastic compositions of the invention. The weight ratio of the reinforcing phase to thermoplastic polymer is generally about 5 to about 50, preferably about 10 to about 45, and most preferably about 20 to about 40, based on parts by weight. It should be understood, however, that these ratios may vary depending on the type of reinforcing phase, thermoplastic polymer used, and relative melt viscosities.

As the Tg and/or Tm difference between the thermoplastic polymer and the higher Tg and/or Tm reinforcing phase increases, a lower amount of reinforcing phase is necessary to achieve the same effects. When formulating compositions of the invention, the Kerner equation is a useful guide for assessing the relative increase in a thermoplastic polymer's flexural modulus upon inclusion of the in-situ polymerized reinforcing phase therein.

Many higher Tg and/or Tm reinforcing phases tend to be prepared from more expensive materials than the thermoplastic polymer component of the compositions. Thus, not only does the use of reinforcing phase with a relatively high Tg and/or Tm lead to an improvement in the flexural modulus of a thermoplastic polymer, but it also makes possible preparation of reinforced thermoplastic compositions at lower cost.

Selection of Processing Equipment and Processing of the Thermoplastic Composition and Articles Once selected, the thermoplastic polymer and non-polymeric precursor are first mixed to form a dispersion of the precursor within a continuous phase of the thermoplastic polymer. Preferably, the dispersion is substantially uniform. The composition can be prepared by mixing the components in any suitable type of equipment. For example, mechanical mixers, such as Banbury-type, Brabender-type, roll mill, Buss, dry turbo mixers and the like are suitable for this purpose.

During this initial mixing step, processing conditions are maintained such that polymerization of the precursor does not occur. When polymerization occurs via a thermal mechanism, for example, the mixing step proceeds at a temperature lower than the polymerization temperature of the precursor. Generally, in preferred embodiments of the invention, the mixing temperature for those systems employing thermal polymerization of the precursor is lower than about 300° C., preferably being maintained in the range of about 100° C. to about 250° C., and more preferably being maintained in the range of about 175° C. to about 235° C.

After mixing the components to the desired homogeneity, polymerization of the precursor may then occur via any suitable polymerization technique, many of which are known, and at any desired time during further processing of the intermediate composition thus formed. For example, the precursor can be polymerized using non-thermal radiation (e.g., electron beam, ultraviolet, infrared, or gamma ray radiation) or thermal radiation. Polymerization can proceed via any of a number of well known mechanisms, some of which include free radical, anionic, and condensation polymerization to name a few. Depending on the type of polymerization technique employed, which may depend upon the type of monomer and/or oligomers present in the precursor, suitable polymerization additives are present in the precursor. Non-limiting examples of polymerization additives include those promoting initiation, acceleration, or catalysis of the monomer and/or oligomer polymerization process.

Preferably, when the non-polymeric precursor is curable by a thermal process, the non-polymeric precursor and thermoplastic polymer are mixed at a temperature below the polymerization temperature of the precursor, as discussed above, and for a time period sufficient to uniformly disperse the precursor within the thermoplastic polymer. Thereafter, the composition is processed further and/or at a higher temperature (i.e., a temperature above the polymerization temperature of the precursor) in order to polymerize the precursor into a reinforcing phase. In particularly preferred embodiments of the invention, the polymerization temperature of the precursor is about 100° C. to about 300° C., more preferably about 175° C. to about 235° C.

During processing, whenever a process temperature increase is needed, the temperature increase can occur incrementally, gradually, or in a single step. Nevertheless, in both the mixing step and the polymerization step, the process temperature is maintained below the temperature at which the thermoplastic polymer would otherwise substantially degrade. Advantageously, the use of temperatures higher than the degradation temperature is not necessary in accordance with the invention.

In most instances, no matter what type of polymerization mechanism is used, processing of the composition and articles therefrom can occur via batch or continuous processing. Using batch or continuous processing, components of the composition can be mixed followed by polymerization of the non-polymeric precursor to form the reinforcing phase (e.g., by mixing the components and heating the precursor in a single piece of equipment or by mixing the components and heating the precursor in multiple pieces of equipment).

Economies of scale for production lead to a preference for continuous processing, whereby the compositions can be prepared and optionally formed into desired shapes and sizes continuously with their preparation. Reactive extrusion equipment and associated accessories are suitable for continuous processing. A wide variety of reactive extrusion equipment can be employed for processing the composition in this manner. Preferred is a twin screw co-rotating extruder with a length-to-diameter (L/D) ratio ranging from about 24 to about 84, and preferably from about 32 to about 64. Utilization of relatively low L/D ratio (e.g., 44 or less) extruders is possible, advantageously, with certain preferred embodiments of the invention.

Advantageously, the intermediate compositions (i.e., those where the precursor is substantially non-polymerized, yet dispersed within the thermoplastic polymer) and intermediate articles therefrom are capable of being further processed using a wide variety of techniques. For example, the compositions are capable of being formed into films, coatings, foams, and molded articles (e.g., by compression or injection molding).

For example, intermediate articles, such as plugs, of the thermoplastic composition can be removed from the mixer and compression-molded into, for example, a 7.6×15.2×0.31 cm (3×6×0.125 inch) plaque mold at a temperature ranging from about 170° C. to about 225° C., and preferably from about 175 to about 200° C. The plug material can be held under no pressure for 30 seconds, after which pressure can be increased to 140 kg/cm$^2$ force over a period of about 3 minutes. After application of pressure of 140 kg/cm$^2$ force for 4 minutes, the samples can be cooled to ambient temperature while pressure is maintained. Plugs of this type can advantageously be transferred to end-users for formation into further desired articles, at which point in time the precursor can also be polymerized.

By polymerizing the reinforcing phase after further processing intermediate compositions and articles in any suitable manner, those further processes advantageously can be performed at much lower temperatures.

As recognizable by those of ordinary skill in the art, additives are added in desired amounts at appropriate times during the above processing. When compatibilizers are added, for example, they can be added either prior to, during, or after polymerization of the non-polymeric precursor according to methods known to those skilled in the art. When reinforcing fillers are desired for incorporation into the polymerized reinforcing phase, however, those reinforcing fillers are generally added prior to polymerizing the precursor, preferably prior to mixing the precursor and the thermoplastic polymer.

Usefulness of the Invention

The invention not only provides further thermoplastic compositions with improved properties such as flexural modulus, but it also provides a more efficient means for preparation of reinforced thermoplastic compositions. The invention makes possible preparation of reinforced thermoplastic compositions previously not capable of being processed efficiently and sometimes not capable of being processed at all. For example, the invention enables preparation of compositions from reinforcing phases that would require the use of temperatures higher than the decomposition temperature of the thermoplastic in order to sufficiently disperse the already polymerized reinforcing phase into the thermoplastic matrix.

As noted, when the reinforcing phase comprises an amorphous polymer, sometimes effective dispersion of the already polymerized reinforcing phase requires heating the composition to temperatures even greater than the Tg of the reinforcing phase. Temperatures as high as about 100° C. greater than the Tg of the reinforcing phase would even be needed in some conventional embodiments. The invention provides an alternative to this inefficient and often impractical dilemma.

The invention also provides post-dispersion processing advantages. Intermediate compositions (i.e., those comprising a thermoplastic polymer having a non-polymeric precursor dispersed therein) are capable of being further processed using a wide variety of techniques. For example, the compositions are capable of being formed into films, coatings, foams, and molded articles (e.g., by compression or injection molding, extrusion, rotational blow molding, powder coating techniques, etc.). Many of those further processes involve heating the composition to form it into the desired shape.

Advantageously, the intermediate compositions can be formed into the desired shape efficiently due to the relatively low viscosity of the intermediate composition as compared to the viscosity of compositions containing a polymerized reinforcement phase. Thus, the end user of the composition is able to efficiently form the composition into the desired article and then polymerize the precursor to a polymerized reinforcing phase. In this manner, articles having an enhanced flexural modulus are obtainable.

Further embodiments and applications of the invention are described in the following non-limiting Examples.

EXAMPLES

Examples 1 and 2

In these examples, a reinforcing thermoplastic phase is provided in a thermoplastic matrix. The reinforcing thermoplastic phase has a higher Tg than the Tg of the thermoplastic polymer matrix, as further augmented by addition of a reinforcing nanoclay filler prior to polymerization of the reinforcing phase.

According to Example 1, a polyamide reinforcing phase can be effectively incorporated into a polypropylene matrix. For example, Polyamide 6 (PA 6) precursors, which include caprolactams and a suitable activator as known to those of skill in the art, are mixed with a polypropylene at a temperature below the polymerization temperature of the PA 6. The temperature of the mixture is then raised to a temperature and for a time sufficient to polymerize the PA 6. Once polymerized, the resultant polyamide reinforcing phase has a Tg of approximately 52° C. In contrast, the polypropylene matrix has a Tg of less than approximately 0° C., the exact Tg of which depends on the tacticity of the polypropylene among other variables.

According to Example 2, the previous example is modified by addition of about 5 weight percent nanoclay filler (based on total weight of the precursors) to the precursors prior to polymerizing the PA 6. Addition of the nanoclay, even in such a small amount, increases the heat distortion temperature of the PA 6 from about 65° C. to about 102° C.

Examples 3 and 4 and Comparative Example A

Table 1 below shows ingredients used for Examples 3 and 4 and Comparative Example A. The ingredients were mixed and melted in a bowl mixer operating at 190° C. After some cooling, the melted mixture was then pressed in a compression press operating at 190° C. and 140 kg/cm² in samples of rectangular, parallel-piped shape and then cut into a shape approximately 5 mm wide, 55 mm long, and 3 mm thick. The samples weighed approximately 0.5 g each.

All of the samples were placed in a forced air oven at 140° C. Approximately 20 mm of each sample was secured between two lead blocks. Approximately 3-5 mm into the free end of the sample, a clip weighing 3 grams and length of 27 mm was attached. From the end of the clip additional weight was hung, for a total weight of 10 grams and approximate total length of 35-40 mm.

The test assembly with the clipped, weighted samples were then removed from the oven and allowed to cool to ambient temperature. When samples reached ambient temperature the clipped weight was removed.

The outline of each of the samples was traced out on to paper. On the paper, to the outline of the samples were added the following lines: (1) a tangent from the end of the sample opposite the end where the sample was clipped (based on seeing an indentation on the sample at about ~3 mm from the one end, the other end was chosen) and (2) a right angle line from that tangent line to end of each sample that had been clipped with the weight. The length of this right angle line from the tangent (i.e., where the outline would have been without heat and weight) to the point of contact with the outline with heat and weight was the deflection displacement of the sample. In other words, the samples drooped with heat and weight on one end, and the difference between the beginning unsupported end and the finished unsupported end was the amount of deflection caused by heating the sample with weight attached to that end.

Table 1 shows the results of the deflection displacement as measured in mm. It is seen that the reinforced compositions of the present invention (Examples 3 and 4) have much lower deflection displacements than their unreinforced counterpart (Comparative Example A). Thus, previously unobtainable reinforced compositions have become reinforced with the result of superior physical performance.

TABLE 1

| Ingredient | Comparative Ex. A | Example 3 | Example 4 |
|---|---|---|---|
| | Weight Percent | | |
| Polypropylene homopolymer[1] | 100 | 80 | 80 |
| Epoxy resin[2] | — | 19.2 | 19.875 |
| Imidazole epoxy curative[3] | — | 0.8 | — |
| Copper acetylacetonate epoxy curative[4] | — | — | 0.025 |
| Hexafluoroantimo-nate epoxy curative[5] | — | — | 0.1 |
| | Millimeters from Tangent Line to End Line | | |
| Deflection Displacement | 7.66 (average of 3 samples) | 6 | 4 |

[1]Grade H1200, Melt Flow 12 g/10 min. from Huntsman Corp., Houston, TX
[2]Epon ™ Resin 828, Bisphenol A epoxy resin from Resolution Performance Products of Houston, TX
[3]2-ethyl-4-methyl imidazole from Aldrich Chemical Co., Milwaukee, WI
[4]Amspec Chemical Corp., Gloucester City, NJ
[5]SarCat ® CD-1012 (diaryl iodonium hexafluoroantimonate, namely [4-[(2-hydroxytetradecyl)oxy]phenyliodonium hexafluoroantimonate]epoxy curative from Sartomer Corp., Exton, PA The invention is not limited to the above embodiments. The claims follow.

What is claimed is:

1. A thermoplastic composition comprising:
   (a) a continuous phase of at least one thermoplastic polymer; and
   (b) a non-polymeric precursor polymerizable to provide a polymerized reinforcing phase dispersed as domains of polymer within the continuous phase of the thermoplastic polymer,
   wherein the polymer domains are spherical and have an average domain size of less than about 100 microns in diameter and wherein the polymer domains of the polymerized reinforcing phase have at least one of a melting temperature greater than about 100° C. or a glass transition temperature greater than about 100° C. and comprises at least one of:
   an amorphous polymer having a glass transition temperature at least about 50° C. higher than the glass transition temperature of the thermoplastic polymer,
   a crystalline polymer having a melting temperature at least about 50° C. higher than the glass transition temperature of the thermoplastic polymer when the thermoplastic polymer is amorphous, or
   a crystalline polymer having a melting temperature at least about 50° C. higher than the melting temperature of the thermoplastic polymer when the thermoplastic polymer is crystalline.

2. The thermoplastic composition of claim 1, wherein the precursor comprises at least one adipate, alkyd, cyanurate, epoxy, ester, ether, imide, lactam, maleimide, melantine, (meth)acrylate, olefin, phenolic, styrene, or combinations thereof.

3. The thermoplastic composition of claim 1, wherein the polymerized reinforcing phase comprises a thermoset polymer.

4. The thermoplastic composition of claim 1, wherein the polymerized reinforcing phase comprises at least one filler.

5. The thermoplastic composition of claim 4, wherein the filler comprises nanoclay.

6. The thermoplastic composition of claim 1, wherein the thermoplastic polymer has a glass transition temperature of about −50° C. to about 250° C. and wherein the polymerized reinforcing phase has a glass transition temperature of greater than about 100° C.

7. The thermoplastic composition of claim 1, wherein the polymerized reinforcing phase has a glass transition temperature of about 100° C. to about 300° C.

8. The thermoplastic composition of claim 1, wherein glass transition temperatures of the thermoplastic polymer and the polymerized reinforcing phase differ by at least about 100° C.

9. The thermoplastic composition of claim 1, wherein the thermoplastic polymer comprises a polyolefin, a poly(meth) acrylate, a plasticized polyvinyl chloride, a polyamide, a polyester, a polystyrene, a polyphenylene ether, a polyaryl sulfide, or combinations thereof.

10. The thermoplastic composition of claim 1, wherein the polymerized reinforcing phase comprises an epoxy, a phenolic, a poly(meth)acrylate, a polyester, a polyether, a polyimide, a melainine resin, or combinations thereof.

11. The thermoplastic composition of claim 1, wherein the polymerized reinforcing phase comprises an amorphous polymer.

12. The thermoplastic composition of claim 1, wherein the composition further comprises at least one compatibilizer for the thermoplastic polymer and polymerized reinforcing phase.

13. An article prepared from the thermoplastic composition of claim 1.

14. A polymer-reinforced thermoplastic composition preparable from the composition of claim 1.

15. A polymer-reinforced thermoplastic composition prepared from the composition of claim 1.

16. A method of preparing the thermoplastic composition, the method comprising:
  providing the at least one thermoplastic polymer;
  dispersing at least one non-polymeric precursor within the thermoplastic polymer under conditions where polymerization of the precursor will not occur; and
  polymerizing the precursor to form a polymerized reinforcing phase of polymer domains dispersed within a continuous phase of the thermoplastic polymer, wherein the polymer domains are spherical and have an average domain size of less than about 100 microns in diameter.

17. The method of claim 16, further comprising the step of forming the thermoplastic composition into an article, wherein the polymer domains have an average domain size of less than about 100 microns in diameter.

18. The method of claim 17, wherein the precursor is polymerized after formation of the thermoplastic composition into the article.

19. A method of increasing flexural modulus of a thermoplastic polymer, comprising:
  providing at least one thermoplastic polymer;
  compounding a non-polymeric precursor into the at least one thermoplastic polymer to form a composition wherein the precursor is uniformly dispersed within the thermoplastic polymer; and
  polymerizing the precursor to form a polymeric reinforcing phase dispersed of polymer domains within the thermoplastic polymer, thereby increasing flexural modulus of the thermoplastic polymer, wherein the polymer domains are spherical and have an average domain size of less than about 100 microns in diameter.

* * * * *